United States Patent [19]

Truscelli et al.

[11] 3,855,622

[45] Dec. 17, 1974

[54] APPARATUS FOR LOADING AND UNLOADING A HEAD ASSEMBLY IN A DATA STORAGE SYSTEM

[75] Inventors: Peter J. Truscelli, Berlin, N.J.; Robert Provasnik, Philadelphia, Pa.

[73] Assignee: Siemens Corporation, Iselin, N.J.

[22] Filed: Jan. 4, 1973

[21] Appl. No.: 320,878

[52] U.S. Cl. .............................................. 360/103
[51] Int. Cl. .............................................. G11b 5/60
[58] Field of Search............ 179/100.2 CA, 100.2 P; 340/174.1 E, 174.1 F; 360/102, 103

[56] References Cited

UNITED STATES PATENTS

| | | | |
|---|---|---|---|
| 3,320,599 | 5/1967 | Billawalla | 340/174.1 |
| 3,491,350 | 1/1970 | Linsley | 340/174.1 |
| 3,503,056 | 3/1970 | Vos | 340/174.1 |
| 3,548,392 | 12/1970 | Walstrom et al. | 340/174.1 |
| 3,599,193 | 8/1971 | Cote et al. | 340/174.1 |
| 3,678,480 | 7/1972 | Stansell et al. | 340/174.1 |
| 3,702,997 | 11/1972 | Jamieson | 340/174.1 |
| 3,733,592 | 5/1973 | Applequist et al. | 340/174.1 |

*Primary Examiner*—Vincent P. Canney
*Attorney, Agent, or Firm*—Maleson, Kimmelman & Ratner

[57] ABSTRACT

A transducer is loaded and unloaded into and out of a flying height position with respect to a rotating disc in a data storage system. A carriage is moveable with respect to the rotating disc and a head having the transducer secured thereto is mounted on the carriage. A head displacement mechanism moveable with respect to the carriage contacts the head mechanism and forces it to a loaded or unloaded position independent of the position of the head with respect to the disc.

10 Claims, 6 Drawing Figures

APPARATUS FOR LOADING AND UNLOADING A HEAD ASSEMBLY IN A DATA STORAGE SYSTEM

BACKGROUND OF THE INVENTION

A. Field of the Invention

This invention pertains to the field of loading and unloading a transducer with respect to a rotating disc in a data storage system.

B. Prior Art

Apparatus for removing head assemblies from rotating discs are known in the art. However, in some prior devices it has been necessary to pull the carriage all the way back across the disc in order to unload the head. Where the disc has had a large surface irregularity, the head mechanism may contact the disc surface and cause irreparable damage to the disc. Contact may shear off positions of the disc or otherwise deform the surfact thereby making the disc unusable. Where a standard disc has been used in prior devices to test head characteristics, the transducer and discs may be damaged when contact occurs.

In some prior devices, the rotating disc is held on a spindle by air pressure. In the event of air pressure decrease, as in the case of compressor or line failure, the disc tends to slip on the spindle. Due to flying characteristics of the head, a certain speed of disc rotation must be maintained or the head will contact the disc and cause severe damage to the head and/or disc. Such prior devices do not provide for unloading of the heads immediately, thus causing damage to the contacting elements.

SUMMARY OF THE INVENTION

Apparatus for loading and unloading into and out of flying height position at least one transducer in relation to a rotating disc. Apparatus comprises a head having the transducer fixedly secured. A carriage moves the head in a longitudinal direction with respect to the rotating disc. A head displacement mechanism is moveably secured to the carriage for displacing the head into and out of the loaded and unloaded portions in relation to the disc independent of the longitudinal movement of the head.

DESCRIPTION OF THE PREFERRED EMBODIMENT

Figure 2:
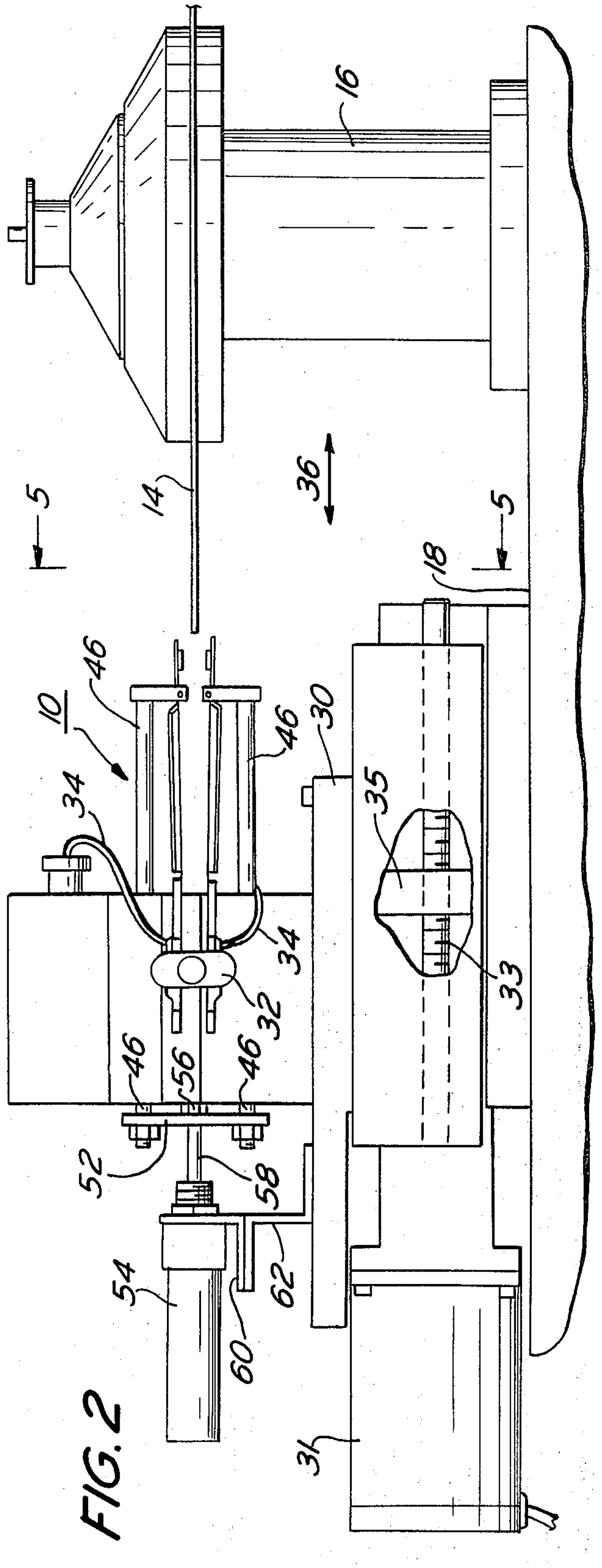
FIG. 2 is a side view partially in section of the loading and unloading apparatus in relation to the rotating disc and showing the apparatus in an unloaded position.
Figure 3:
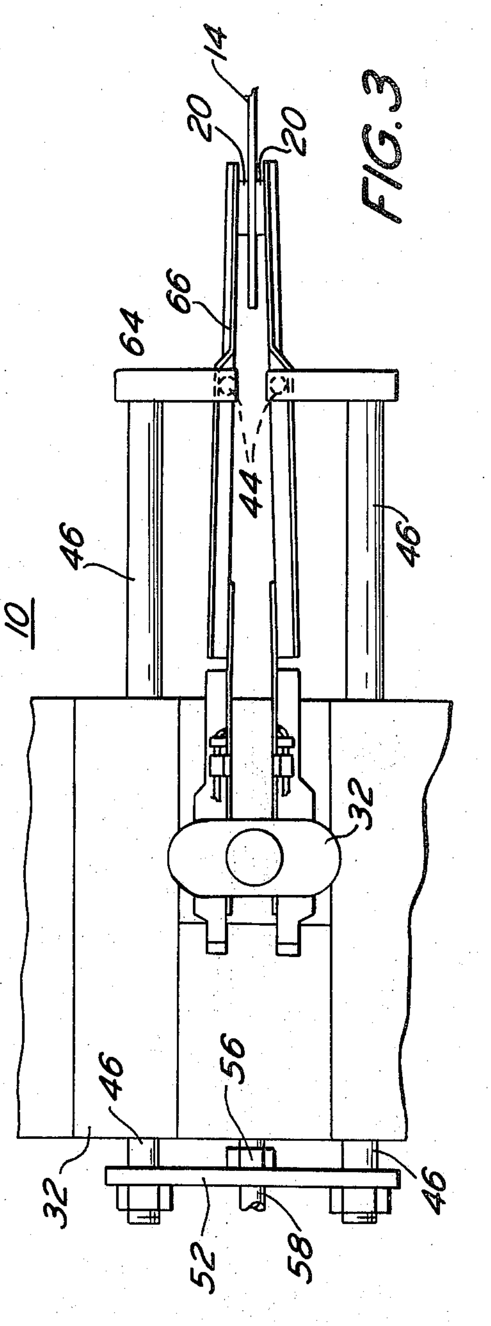
FIG. 3 is a side view partially in section of the loading and unloading apparatus showing the apparatus in a loaded position.

Referring now to FIGS. 1–6, there is as shown magnetic transducer regulation apparatus 10 for use in connection with data storage testing system 12. System 12 includes disc 14 mounted to spindle 16 which interfaces with the deck plate 18 as is clearly shown in FIG. 1. Apparatus 10 includes transducer or slider 20 shown in FIG. 6 and is placed in spaced relation on opposing horizontally oriented sides of disc 14 as shown in FIGS. 2 and 3. As is commonly known in the art, tranducers 20 are electrically connected to system 12 in order to provide read-out or write data on display and control panel 22.

For purposes of description, system 12 may either be a disc testing system where surface irregularities of disc 14 are monitored or a transducer testing system whereby standard disc 14 is mounted on spindle 16 and a series of magnetic transducers 20 are tested to determine their characteristics. System 12 may be Model DT-333 single disc test system manufactured by Computest Corporation of Cherry Hill, New Jersey, or some like system.

Figure 1:
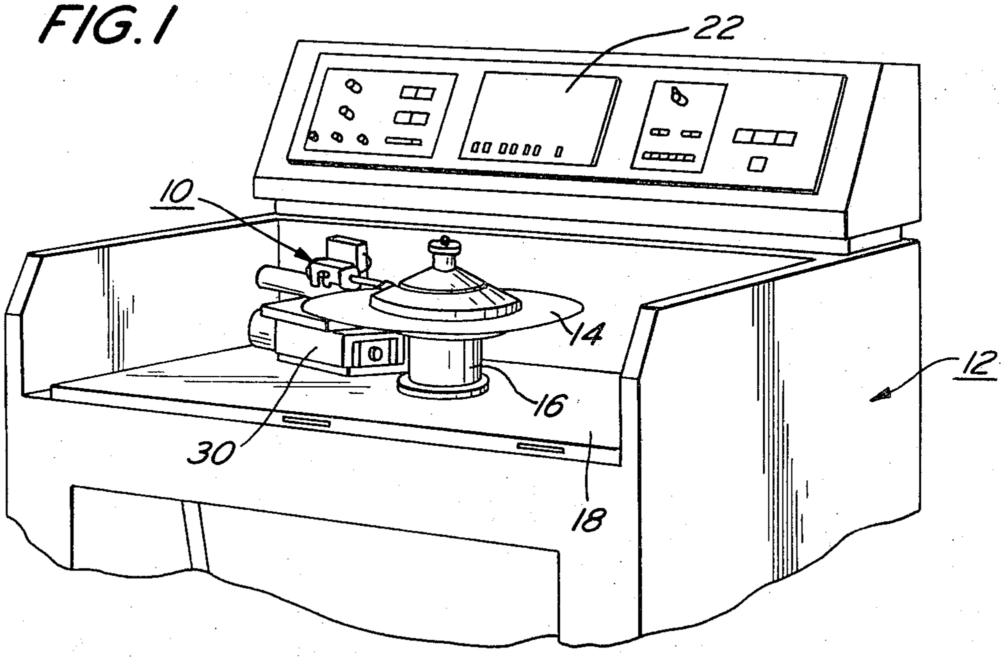
FIG. 1 is a perspective view of the loading and unloading apparatus mounted on a data storage system.
Figure 4:
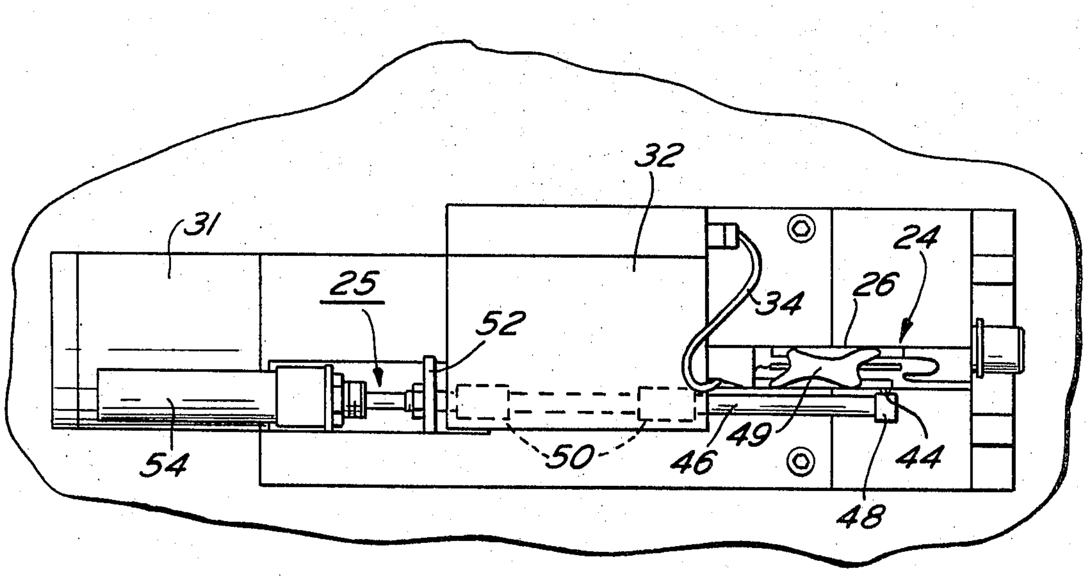
FIG. 4 is a top view of the loading and unloading apparatus.

Regulation apparatus 10 includes head mechanism 24 mounted to carriage 30 which is moveable in a direction defined by arrows 36. Head displacement mechanism 25, shown in FIG. 4, is moveably secured to carriage 30 for displacing head 24 into and out of what is commonly known as the loaded and unloaded positions with respect to rotating disc 14. The loaded position is demonstrated in FIG. 3 where transducers 20 are in a flying height position above and below the horizontally rotating surfaces of disc 14.

As is well known in the art, the flying height position of transducers 20 is maintained only when the relative velocity between head 24 and the surfaces of disc 14 is sufficient to maintain the spacing therebetween. Heads 24 are maintained in the proper respective relationship through conventional control mechanisms. FIG. 2, in general, shows heads 24 moved or displaced out of the flying height position responsive to actuation of head displacement mechanism 25.

Figure 5:
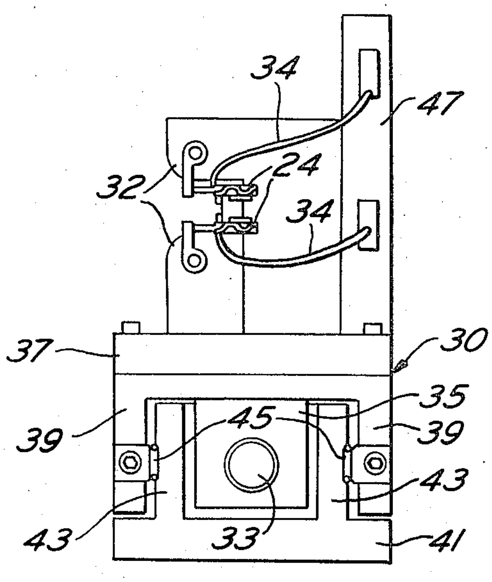
FIG. 5 is a front view of the loading and unloading apparatus taken along the section line 5—5 of FIG. 3; and, FIG. 6 is a perspective view of the head mechanism and a pin member of the head displacement mechanism.

Carriage 30, with associated head mechanism 24 is reversably moveable in direction 36 which in turn defines a radial displacement with respect to rotating disc 14. Carriage 30 is moveable through actuation of carriage stepping motor 31. Threaded screw 33 shown in FIG. 2 is rotated through actuation of motor 31. Screw 33 passes through and is mated to threaded block 35 which is secured to moveable upper plate 37 of carriage 30. Carriage upper plate section 35, in cross-section takes the form of an inverted U-section with downwardly directed legs 39 as shown in FIG. 5.

Carriage secured base element 41 is fitedly mounted to disc plate 18. Motor 31 is fastened to a rear section of element 41. Legs 39 interface with secured base element legs 43 within tracks 45.

In this manner, actuation of motor 31 plate 37 and attached head 24 are secured to carriage frame mounting units 32 in somewhat of a cantilevered fashion to permit movement of heads in a restricted vertical path. Heads 24 are electrically connected to preamplifier 47 through flexible leads 34. Both units 32 and preamplifier 47 are rigidly constrained to plate 37 and are moveable with plate 37.

Figure 6:
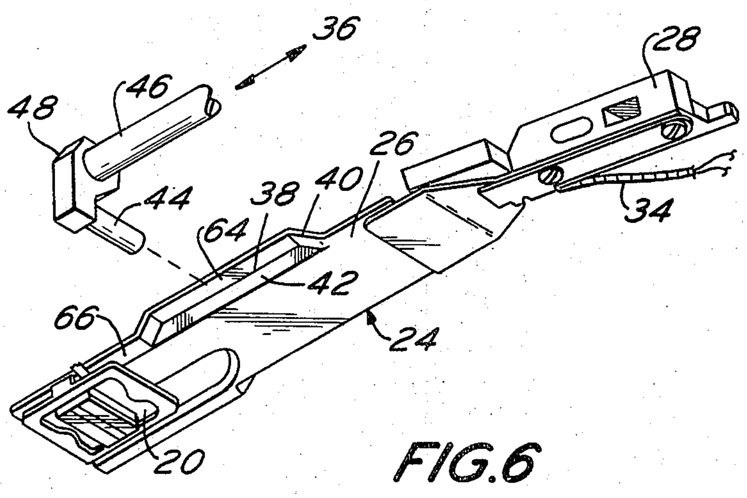

Head 24, as shown clearly in FIG. 6, includes elongated mounting element 26 having slider 20 rigidly secured on one end thereof and support arm 28 mounted on an opposing end as shown. Head 24 is movably mounted to carriage 30 through support arm 28 interface with unit 32.

Channel 38 forms an elongated depressed area passing along the base surface of mounting element 26 through inclined ramp of 40. Channel 38, ramp 40 and vertical wall 42 provide a restrained guide or track for pin member 44. Pin member 44 is rigidly secured to rod 46 through flange element 48, as shown in FIG. 6.

As seen in FIG. 4, mechanism 25 includes rods 46 passing through carriage frame mounting units 32 and are movable with respect thereto by insertion through ball bearing bushing 50. In this manner, it is seen that each of rod members 46 is movable with respect to carriage member 30 in direction 36. Additionally, each of rods 46 are mounted to bar member 52 through bolting. Bar 52 is, in turn, centrally mounted to an air cylinder 54 through bar bolt mechanism 56. Air cylinder 54 may be of reverse single acting pull type. Cylinder 54 is preferably a ¾ inch bore standard air cylinder where rod or piston 58 is normally extended and has a spring return. One such type of air cylinder operated successfully is manufactured by Bimba Mfg. Company of Monee, Illinois and is of the model type 04–R. Air cylinder 54 is rigidly secured to carriage member 30 through one L-shaped or two bracket mounts 60, 62 as shown in FIG. 2.

In this manner head 24 is secured to carriage member 30 and moveable in longitudinal direction 36 responsive to the motion of carriage 30 and frame 32. Additionally, rods 46 are moveable with respect to carriage 30 in longitudinal direction 36 as a function of the actuation of air cylinder 54.

Assume now that regulation apparatus 10 is placed in a loaded condition. The loaded condition is shown in FIG. 3 where sliders 20 are displaced into a predetermined flying height position with respect to opposing surface of disc 14. To achieve this condition, air pressure is applied to cylinder 54 to drive cylinder rod or piston 58 in longitudinal direction toward the axis of rotation of disc 14. Associated rods 46 are driven in a coincident direction to that of rod 58 and force pins 44 into lower or first channel surface 64. Heads 24 are cantilever mounted to mounting unit 32 as shown, and are positionally biased to permit displacement of mechanisms 24 toward the surfaces of disc 14 when pins 44 are driven into first surface 64. Therefore, actuation of cylinder 54 through pressure loading drive rods 46 in longitudinal direction 36 results in a movement of each head 24 in a direction substantially normal to the plane of rotation of disc 14. Actuation of cylinder 54 has the effect of causing a motion of head mechanism 24 independent of the motion of carriage 30 for placement of mechanism 24 at a predetermined radial distance and at a predetermined flying height position with respect to disc 14.

When air pressure is reduced in air cylinder 54 head 24 is driven to an unloaded condition as shown in FIG. 2. In this condition, opposing heads 24 are displaced away from opposing surfaces of disc 14 in a direction substantially normal to the plane of rotation of disc 14. When the air pressure in cylinder 54 is diminished, spring loaded rod 58 is driven in a longitudinal direction away from the center of rotating disc 14. Pins 44 are driven along inclined ramps 40 and onto upper channel surfaces 66 as is shown in FIG. 2. This has the effect of driving sliders 20 away from disc surface disc 14 and out of the predetermined flying height position.

In some standard systems, air pressure is used to clamp disc 14 onto spindle 16. In the event of an air loss or failure, disc 14 begins to slip. With disc 14 in a slipping mode of operation, floating head mechanism 24 may be destroyed or damaged. However, as previously described air pressure is used to actuate air cylinder 54 during apparatus 10 to a loaded condition. In the event of a loss of air pressure, a spring return in air cylinder 54 moves the rod or piston member 58 in a direction so as to unload head mechanism 24, thereby increasing the safety factor associated of regulation apparatus 10.

As previously described regulation system 10 operates in conjunction with disc or transducer testing system 12. However, it will be understood by one skilled in the art that regulation apparatus 10 may be used in standard input/output memory systems. In such systems it is very important to position the read/write head with respect to disc 14 and maintain a predetermined spaced relation between head 24 and the surface of rotating disc 14. In such systems head 24 may be used for both read and write operations. Additionally a plurality of heads may be used with a multiplicity of discs 14. In practice, up to 20 head mechanisms 24 have been frequently used for operation on ten discs 14.

What is claimed is:

1. Apparatus for loading and unloading into and out of a flying height position respectively, at least one transducer in relation to a rotating disc in a data storage system, comprising:

a. head means having said transducer fixedly secured thereto and having an inclined ramp;

b. carriage means moveably mounted to said data storage system for moving said head means in a longitudinal direction with respect to said rotating disc; and, c. driving means moveably secured to said carriage means, said driving means having pin means slideably engaging said inclined ramp for moving said pin means reversibly in said longitudinal direction for displacing said head means into and out of said loaded and unloaded positions in relation to said rotating disc independent of said longitudinal movement of said head means.

2. The loading and unloading apparatus of claim 1 where said driving means moves said head means to and from said disc into said loaded and unloaded positions respectively in a direction substantially normal to a plane of rotation of said rotating disc.

3. The loading and unloading apparatus of claim 2 where said driving means is moveably mounted to said carriage means, said driving means being moveable with respect to said carriage means in a direction substantially coincident with said carriage means direction of movement.

4. The loading and unloading apparatus of claim 3 where said pin means slideably engages said inclined ramp on a 1) first surface of said head means for forcing said transducer to said loaded position with respect to said rotating disc, and on a 2) second surface of said head means for forcing said transducer to said unloaded position.

5. The loading and unloading apparatus of claim 4 where said first and second head surfaces are extended in said longitudinal direction and are parallely displaced, said first and second head surfaces being joined in one piece formation.

6. The loading and unloading apparatus as recited in claim 5 where said first head surface forms on elongated channel guide within said head means.

7. The loading and unloading apparatus as recited in claim 1 where said pin means comprises at least one pin member and said driving means includes air cylinder means rigidly connected to said pin member for reversibly driving said pin member from a first to a second head means surface, said surfaces being in parallel displacement each to the other.

8. The loading and unloading apparatus as recited in claim 7 where said air cylinder means includes:

a. an air cylinder secured to said carriage means;

b. an air cylinder piston rod moveable in said longitudinal direction and connected on opposing ends thereof to said air cylinder and said pin member.

9. The loading and unloading apparatus as recited in claim 8 where said pin member is forced to said first surface when high pressure air is applied to said air cylinder thereby forcing said head means into said loaded position.

10. The loading and unloading apparatus as recited in claim 9 including means for driving said pin member from said first surface to said second surface when said high pressure air is removed from said air cylinder thereby forcing said head means into said unloaded position.

* * * * *